ing of -(C₂H₄O)ₙ- and polyether radicals which are a com-
3,388,170
POLYOXYETHYLENE ADDUCT OF 2,6-DI-t-BUTYLPHENOL Eugene Edward Magat, Wilmington, and Isaac Fletcher Walker, Hockessin, Del., assignors to E. I. du Pont de Nemours and Company, Wilmington, Del., a corporation of Delaware
No Drawing. Continuation-in-part of application Ser. No. 378,033, June 25, 1964. This application July 30, 1965, Ser. No. 476,181
1 Claim. (Cl. 260—613)

This application is a continuation-in-part, in turn, of U.S. applications Ser. No. 378,033, filed June 25, 1964, and now abandoned, and Ser. No. 292,111, filed July 1, 1963, and now abandoned.

This invention is related to a novel and useful polyether and to a composition of matter and shaped structures formed therefrom in which it is particularly useful. More especially, the invention is related to antistatic filaments of polyamides and polyesters.

It is an object of this invention to provide a novel and useful polyether.

Another object is to provide a composition of matter of a polyether and a synthetic fiber-forming polyester or polyamide, the shaped structures of which are durably antistatic as well as resistant to rapid dye fading on exposure to light or heat.

These and other objects will become apparent in the course of the present specification and claims.

In accordance with the present invention a polyether is provided having the formula

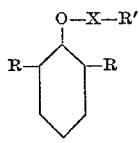

wherein the hexagon represents the benzene nucleus, R is a monovalent hydrocarbon radical, R' is a member of the class consisting of hydrogen and a capping radical and X is a divalent polyether radical from the class consisting of -(C₂H₄O)ₙ- and polyether radicals which are a combination of -(C₂H₄O)ₙ- and a polyether radical from the class consisting of -([CH₂]ₓO)ᵧ- and

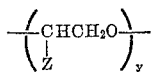

wherein $n$ is a number of from about 10 to about 200, $x$ is a number from 3 to 4 inclusive and $y$ is a number such that the ratio of $n/y$ is above about 4, and Z is a monovalent radical from the class consisting of alkyl, halogen substituted alkyl and hydroxyl. Preferably the polyether of the present invention has the formula

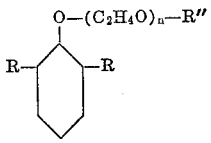

wherein R" is a member of the class consisting of R', -([CH₂]ₓO)ᵧR' and

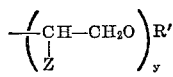

and $y$ is a number of from 2 to about 10 inclusive. By a "capping radical" is meant a coupling radical or a nonpolyamide or polyester reactive substituent preferably from the class consisting of lower alkyl, lower alkaryl, single ring carbocyclic, lower acyl and, in conjunction with the terminal oxygen, inorganic acid ester. By a "coupling radical" is meant one which "couples" two or more polyether derivatives of the 2,6-substituted phenol. As illustrated hereinafter three such molecules can be coupled using PCl₃ and two may be coupled using resorcinol diglycidyl ether. The alkylene oxide condensate, uncapped or capped (or coupled), shows a "reversed" solubility in water, in that it precipitates on heating. This is indicated by its cloud point, i.e. that temperature at which turbidity first appears on heating a solution of 0.1% trisodium phosphate (Na₃PO₄·12H₂O) in water containing 1% (wt./wt.) of the condensate, starting at room temperature.

The polyester, when its cloud point is at least about 30° C., is particularly useful as a component of a composition of matter comprising (1) a polymer from the class consisting of a polyamide and a polyester and (2) the polyether of the present invention, the said polyether constituting from about 1% to about 30% by weight of the composition, and being present as a uniformly distributed separate phase in the polymer. A particularly useful polymeric composition within that described above is one wherein the novel polyether, with an $n$ from about 10 to about 50, and polyethylene glycol having a molecular weight of from about 2,000 to about 20,000 are dispersed through the polymer in approximate equal parts by weight, the dispersed phase constituting from about 1% to about 30% by weight of the polymeric composition. Filaments from these polymeric compositions are highly antistatic. The antistatic effect is durable to scouring. In addition, scouring removes a portion of the antistatic additive leaving microscopic voids in the filaments which provide a delustering effect giving a fabric of increased covering power.

The following examples, in which parts and percentages are by weight unless otherwise specified are cited to illustrate the invention. They are not intended to limit it in any manner. In the examples the static propensity of the fabrics reported herein is given in terms of the direct current resistance in ohms per square (the units of area being immaterial), measured parallel to the fabric surface at the given temperature and humidity according to the A.A.T.C.C. method, C-76-59. In the dyeing of fabric upon which various measurements are reported in the examples, the fabric is immersed in the cold dye bath, heated to boiling slowly with constant stirring, then continued at the boil for 60 to 90 minutes. Each fabric is then rinsed and dried. In samples to which dyes A through E are applied, the fading resistance of the dried samples is tested by exposing to a xenon arc with a Pyrex glass screen (Hanua Xenotest Machine). The indicated exposure times are calculated in terms of sunlight exposure in the ratio of 1 xenon hour equals 1.5 sun hours. The samples are rated for resistance to fading as follows: 5 indicates no change, 4 tolerable fading, 3 unacceptable fading and 1 nearly complete loss of color. Resistance to thermal fading of dyes A through E is determined by heating the dyed fabrics in an air oven at 150° C. for the period indicated. The change observed is rated on the same scale described for light exposure. In samples to which dyes F and G are applied, the samples are first tested for resistance to thermal fading (to simulate heat setting) and then the same sample is tested for light fading by exposure to the ultraviolet radiation of the Hanau Xenotest. For convenience in presenting comparative data, the dyes employed in the various examples are coded A through G. The dye compositions are listed below. Dyes A and B are applied as 0.1% by weight aqueous solutions of the dyes listed in Table I, the numerals under the identifying color indicating parts by weight of the various components.

TABLE I

| Dyestuffs | A (Green) | B (Sand) |
|---|---|---|
| Disperse Yellow 3 | 12.5 | 3.7 |
| 1-amino-4-hydroxy-2-(2-hydroxyethoxy) anthraquinone | 5.7 | 3.7 |
| Disperse Blue 7 | 5.7 | 0.7 |
| Disperse Blue 3 | 1.4 | 0.7 |

Dyes C, D and E are applied as 0.3% by weight aqueous solutions of the dyes of Table II.

TABLE II

| Code: | Dye |
|---|---|
| C | Acid Red 182 |
| D | Acid Blue 165 |
| E | Acid Green 25 |

Master solutions for dyes F and G are made up by diluting the dyes of Table III with water to 1000 ml.

TABLE III

| Code | Dye | Grams |
|---|---|---|
| F | Acid Brown 10 | 2.65 |
|  | Acid Red 57 | .36 |
|  | Acid Blue 40 | .29 |
| G | Acid Blue 40 | 1.00 |
|  | Mord. Orange 6 | 0.10 |

Dyebaths of F and G dyes are made up from 20 ml. of stock solution and 2 ml. of a leveling solution (of 5.9 grams of 85% phosphoric acid, 7.5 grams of a di-secondary butyl naphthalene sulfonate in 990 ml. of water) per gram of fabric (with a fabric weight of 6–9 grams) diluted to 300 ml.

In each fiber preparation in the examples indicated parts of the polyether of the invention is blended with 100 parts of non-delustered, fiber-forming 66 nylon (polyhexamethylene adipamide) having a relatively viscosity of about 36, each sample containing in addition 0.5% by weight of sodium phenyl phosphinate, a conventional polyamide antioxidant. After conventional spinning, the yarn is drawn and knit to tubing for testing with the various dyes.

Preparation of the antioxidant-antistat

A glass reactor is swept with dry nitrogen and then charged with 283 parts (representing 1.373 mols) of 2,6-di-tert-butylphenol and 0.63 part of a 52% dispersion of sodium hydride in white mineral oil (representing 0.0137 mol). The charge is blanketed with nitrogen and heated to 110° C. A mixture of ethylene oxide vapor and nitrogen (dried to 3 p.p.m. of moisture) is introduced under the surface of the charge and the temperature is adjusted to 125±5° C. Ethylene oxide addition is continued until the charge in the flask has increased in weight by 268 parts (6.09 mols of ethylene oxide absorbed). There is withdrawn from the reactor 548 parts of polyether alcohol (molecular weight 401) and this material is further reacted as above with 0.63 part (0.0137 mol) of sodium hydride dispersion and 2213 parts (50.3 mols) of ethylene oxide. At this point, 779 parts of the polyoxyethylated phenol (molecular weight 2023) are removed for a subsequent reaction. The remainder of the phenol derivative (representing the 41.3 mol ethylene oxide adduct of 2,6-di-tertiary butylphenol) is neutralized with 2.3 parts of glacial acetic acid. The product is a liquid which crystallizes on cooling to a solid. A 5% aqueous solution of the product has pH of 5.4. The average molecular weight by hydroxyl number end group analysis is 2067 and the mol ratio of ethylene oxide to phenol is 41:1. This material is coded E–41.

The 779 parts of polyoxyethylated phenol previously removed is then reacted following the technique described above, with 0.53 part of a sodium hydride dispersion (0.0116 mol) and 1187.5 parts of ethylene oxide (26.9 mols). The final product, which is the 111.6 mol ethylene oxide adduct of 2,6-di-tertiary butylphenol, is acidified with 1.8 grams glacial acetic acid. The product is a light green liquid which crystallizes to an off-white solid on cooling. The pH of a 5% aqueous solution is 5.3, and the average molecular weight by hydroxyl number is 5195. This product has a mol ratio of ethylene oxide to phenol of 111:1 and is coded E–111.

The above procedure is followed to prepare the ethylene adducts of 2,6-di-tertiary butylphenol containing a mol ratio of ethylene oxide to phenol of 40:1 and 200:1 (coded samples E–40 and E–200, respectively). The same technique is followed to prepare an adduct of 2,6-di-tert-butyl-4-methyl phenol wherein the ethylene oxide to phenol ratio is 47:1, this sample being coded MeE–47.

The samples prepared as described above are melt blended with 66 nylon in weight percentages based on nylon as shown in Table IV. Except as noted each sample of polymer composition contains 0.5% by weight of sodium phenyl phosphinate as an antioxidant. In the table the figures under "Sun" indicate hours of exposure of knitted tubing prepared from yarn spun from the polymer composition and dyed with the various dyes as indicated. The figure under "Heat" indicates minutes of exposure at 150° C. in a circulating air oven. Control samples are indicated as Examples 7–10 inclusive, the code "PEG-20" indicating polyethylene glycol having a molecular weight of about 20,000. The "log R" value where determined is reported in the table to indicate the antistatic properties of the various fibers; it is measured at 20% RH, 78° F.

TABLE IV

| Ex. | Additive | A dye Sun 30 | A dye Sun 60 | A dye Heat 15 | A dye Heat 30 | B dye, Heat 15 | B dye, Heat 30 | C dye Sun 60 | C dye Sun 90 | C dye Heat 15 | C dye Heat 30 | D dye Sun 60 | D dye Sun 90 | D dye Heat 15 | D dye Heat 30 | E dye Sun 60 | E dye Sun 90 | E dye Heat 15 | Log R |
|---|---|---|---|---|---|---|---|---|---|---|---|---|---|---|---|---|---|---|---|
| 1 | 10% E 41 | 5– | 4 | 5 | 5– | 5 | 5– |  |  |  |  |  |  |  |  |  |  |  | 12.9 |
| 2 | 5% E 41 | 5– | 4– | 5– | 5-4 | 5– | 5– |  |  |  |  |  |  |  |  |  |  |  | 12.6 |
| 3 | 10% E 111 | 5– | 4– | 5– | 4 | 5 | 5-4 |  |  |  |  |  |  |  |  |  |  |  | 12.6 |
| 4 | 10% E 200 | 4 | 4-3 | 5 | 5-4 |  |  |  |  |  |  |  |  |  |  |  |  |  | 13.0 |
| 5 | 5% E 41, 5% PEG-20 | 5 | 5-4 | 5– | 5– | 5 | 5 |  |  |  |  |  |  |  |  |  |  |  | 13.3 |
| 6 | 10% E 40 | 5 | 5– | 5-4 | 5– | 5-4 | 5– | 5 | 5-4 | 5 | 5 | 4 | 4-3 | 5 | 4 | 5 | 5 | 5 | 12.8 |
| 7 | 5% PEG-20 | 4+ | 3– | 5– | 3 | 3-2 | 5 | 3 |  | 2 | 2 |  | 3-2 | 2-1 |  |  | 4 |  | 12.9 |
| 8 | 10% PEG-20 |  |  |  |  |  |  |  | 3 |  |  |  | 3-2 |  |  |  |  |  |  |
| 9 | None | 5-4 | 5-4 | 5– | 5– | 5– | 5 | 5 | 5 | 5 | 5 | 5 | 5 | 5 | 5 | 5 | 6– | 5 | +15 |
| 10 | MeE-47 |  |  | 5-4 | 3 | 5– | 4– |  |  |  |  |  |  |  |  |  |  |  | 12.0 |

From a consideration of the table it will be obvious that although the polyethylene glycol additive improves the antistatic properties of the fiber, it seriously affects the durability of the dye (compare Examples 7, 8 and 9). The compositions of the present invention on the other hand (Examples 1–6 inclusive) afford comparable antistatic protection to the polyethylene glycol additive without the deleterious effect upon the dye. The criticality of the nature of the butylphenol is indicated by Example 10 where a methyl group substituted on the aromatic ring causes the additive to promote dye breakdown. Similar results are obtained when 6 nylon is substituted for the 66 nylon.

In addition to the simple ethylene oxide adducts described in Table IV mixed oxide adducts, capped adducts and coupled adducts are also effective. In Table V Examples 11–14 inclusive and 20 indicate various mixed oxide adducts. Examples 15, 16, 21, 22, 23 and 24 illustrate capped oxide adducts and Examples 17 and 25 illustrate a coupled oxide adduct. A preparation of these various materials and the identification of the codes are presented hereinafter. In the table the data under "Sun (60)" indicates the condition of the sample after exposure to sixty hours of sunlight (i.e., xenon equivalence) the same sample having been exposed previously to fifteen minutes of 150° C. heat (i.e. "Heat (15)"). This testing procedure is more stringent than that employed in the samples of Table IV, but is considered to be more comparable to operating conditions where the fabrics may be heat-set prior to exposure to sunlight. As in the samples of Table IV the additives are added to 66 nylon in the melt, the samples each containing 0.5% sodium phenyl phosphinate. The tests are run on fabric knitted from yarn spun from the polymer compositions.

water bath. Temperature continues to rise until the liquid is at 95° C. and considerable refluxing of the propylene oxide and benzene occurs. The reaction product is purified by the usual procedure. The final product is a solid, which is water soluble. Cloud point of a 1% aqueous solution was 61–62° C. The product had a specific resistivity of $2.5 \times 10^7$ ohm–cm. at 25° C. (from extrapolation of measurements on liquefied material). It had 478 hydroxyl ends per $10^6$ g., equivalent to a molecular weight of 2090; this indicates an average addition of 6.7 units of propylene oxide to the starting compound. The mol ratio is 1:34:6.7. The adduct is coded E 34 P 7.

TABLE V

| Ex. | Additive | F dye | | G dye | | Log R |
|---|---|---|---|---|---|---|
| | | Sun (60) | Heat (15) | Sun (60) | Heat (15) | |
| 11 | 10% E 34 E 4 | 2 | 4–3 | 4–3 | 5–4 | 14.4 |
| 12 | 10% E 34 P 7 | 4 | 5–4 | 5 | 5 | 13.5 |
| 13 | 10% E 34 Tr 5 | 4 | 5–4 | 4 | 5–4 | 13.2 |
| 14 | 10% E 34 Te 3 | 4–3 | 5–4 | 4 | 5–4 | 14.2 |
| 15 | 10% E 18 Me | 4–3 | 4 | 4 | 5–4 | 13.5 |
| 16 | 10% E 10 Me | 4–3 | 5 | | | 13.2 |
| 17 | 10% E 34 coR | 4–3 | 4 | 4–3 | 4 | 13.2 |
| 18 [1] | 5% PEG–20 | 2 | 2 | 1 | 2 | 12.9 |
| 19 | 10% E 10 P1 | 3 | 4 | 4 | 5–4 | 13.5 |
| 20 | 10% E 21 P3 | 4 | [2] 5–4 | 3 | [2] 4 | 11.5 |
| 22 | 10% E 10 Ac | 5–4 | [2] 5–4 | 4–3 | [2] 4–3 | 12.9 |

[1] Control.
[2] Exposed 30 min. at 150° C.

The resistance to breakdown of the dyes upon fibers containing the additives of the present invention as compared with those containing an even smaller amount of polyethylene glycol 20,000 is obvious from the table. Preparation of these various additives and the identity of the code designations is given below.

EXAMPLE 11

Two hundred parts of the addition product of 2,6-di-t-butylphenol and ethylene oxide in a molar ratio of 1:34 and two hundred fifty parts of benzene are charged to a 3-neck glass flask containing a magnetic stirring bar. The mixture is heated to boiling with stirring and about 10 parts of the benzene boiled off to expel any moisture present in the system. The openings of the flask are immediately closed by a reflux condenser, a thermometer dipping into the liquid and a nitrogen inlet tube. Contents of the flask are cooled to 15° C. under a nitrogen atmosphere. Twenty-five parts of epichlorohydrin are added through the condenser and then 4 parts of 45% solution of $BF_3$ in ether dissolved in 25 parts of benzene are added in the same manner.

The reaction mixture is heated to 40° C. to initiate the reaction of the epichlorohydrin. Thereupon the temperature rises rapidly to 57° C., then begins to drop. External heating is again applied to raise the temperature to 75° C., at which point heating is stopped. The cooled mixture is washed with diluted NaOH solution, then with water to neutrality. The reaction product is freed of solvent and by-products by heating to 150° C. under a pressure of 2 mm. Hg. The product is a pale amber liquid containing 6.3% chlorine. It is soluble in water and has a specific resistivity of $3 \times 10^7$ ohm–cm. The cloud point of a 1% aqueous solution of this material is 34° C. The original ethylene oxide/2,6-di-t-butylphenol adduct has a cloud point over 100° C. Based on the chlorine analysis, the mol ratio of phenyl to ($C_2H_4O$) to ($ClCH_2CHCH_2O$) is 1:34:3.6. This adduct is coded E 34 E 4.

EXAMPLE 12

Two hundred parts of the addition product of ethylene oxide and 2,6-di-t-butylphenol (mol ratio 34:1) and 250 parts of benzene are blended and freed of moisture as in Example 11. To the cooled solution (15° C.) is added 100 parts of propylene oxide and 4 parts of 45% $BF_3$ in ether. The temperature of the mixture begins to rise immediately and the reaction flask is cooled in a 5° C.

EXAMPLE 13

Following the procedure of Example 11, 200 parts of the ethylene oxide/2,6-di-t-butylphenol adduct (mol ratio 34:1) react with 40 parts of trimethylene oxide. The spontaneous rise in temperature stops at 52° C. The mixture is slowly heated to 75° C., then cooled and purified as before. The final product is a solid, soluble in water. A 1% aqueous solution has a cloud point of 75° C. Its specific resistivity is $2.4 \times 10^7$ ohm-cm. (extrapolated to 25° C.). It has 515 OH ends per $10^6$ g., equivalent to the average addition of 4.9 units of trimethylene oxide to the starting compound, or an overall mol ratio of 1:34:4.9. The adduct is coded E 34 Tr 5.

EXAMPLE 14

The reaction of 200 parts of the ethylene oxide/2,6-di-t-butylphenol adduct is carried out by the procedure of Example 11 using 60 parts of tetramethylene oxide. In this case no spontaneous rise in temperature occurs. The mixture is heated at reflux temperature (80° C.) for 1 hour, then purified as before. The product is a white, waxy solid, soluble in water. It has a specific resistivity of $8.3 \times 10^7$ ohm-cm. (extrapolated to 25° C.). It has 531 OH ends per $10^6$ g., indicating the addition of 2.6 units of tetramethylene oxide to the starting compound; the overall mol ratio is thus 1:34:2.6. The adduct is coded E 34 Te 3.

EXAMPLE 15

A glass reactor is charged with 1942 parts of the ethylene oxide adduct of 2,6-di-t-butylphenol with an oxide:phenol ratio of 17.5:1, 46 g. of metallic sodium and 1000 parts of xylene. This mixture is stirred under a blanket of nitrogen and heated at 120–130° C. for 20 hours to complete the formation of the sodium alkoxide. The mixture is cooled to 50° C. and treated with an excess of methyl iodide, thereby forming the methyl ether of the original antioxidant antistat. The reaction mixture is diluted with 2000 parts of benzene to reduce its viscosity and by-product sodium iodide is filtered off. The filtrate is washed with water 3 times in a separatory funnel and then stripped of solvent by gradually heating to a temperature of 160° C. under a pressure of 2 mm. Hg. The final product is a pale amber liquid which solidifies upon cooling to room temperature. It is coded E 18 Me.

EXAMPLE 16

The procedure of Example 15 is followed with appropriate changes in proportion to make the methyl capped derivative of the adduct of ethylene oxide and 2,6-di-t-butylphenol, where the ratio of oxide to phenol is 10.3:1. This material is coded E 10 Me.

EXAMPLE 17

One thousand parts of the adduct of 34 mols of ethylene oxide per each mol of 2,6-di-t-butylphenol is charged to a glass reactor and melted under a blanket of nitrogen. One part of sodium metal is added and converted to the alkoxide by heating and stirring at 140° C. The product is cooled to 60° C., and a solution of 80 parts of resorcinol diglycidyl ether in 175 parts of benzene is added to the reactor with stirring. Stirring is continued and the temperature gradually increased until the benzene is is driven off. At 170° C. an increase in voscosity of the liquid mixture is observed. Heating is stopped when the temperature reaches 240° C. After cooling, 80 parts of methanol and 350 parts of benzene are added to dissolve the product. This solution is washed with 10% salt solution and with water. Solvent is then stripped from the product in the usual manner. The product is an amber solid, the coupled reaction product of one mol of the resorcinol ether and 2 mols of the adduct. It is coded E 34 coR.

EXAMPLE 19

Another coupled reaction product is formed wherein 3 mols of the adduct of ethylene oxide and 2,6-di-t-butylphenol in a ratio of 10.3:1, are combined through trivalent phosphors as phosphite radical. In this preparation three hundred parts of an antioxidant-antistat having an EO/DTBP ratio of 10.3 are reacted with 11.1 parts of sodium metal by the procedure of Example 11. The sodium alkoxide solution is cooled to 60° C. and treated with a solution of 22 parts of $PCl_3$ in 100 parts of xylene, using a cooling bath to keep the temperature at 60° C. The mixture is then heated two hours at 100° C., then cooled and diluted with 500 parts of benzene and 300 parts of isopropyl alcohol. The mixture is extracted with water four times in a separatory funnel and then stripped of solvent by gradually heating to 165° C. under a pressure of 2 mm. Hg. The final product is a pale yellow liquid which contains 1.1% phosphorus; it is coded E 10 P 1.

Ten parts of this product are melt blended with 100 parts 66 nylon and 0.5 part nylon antioxidant. Fibers prepared therefrom have a log R of 13.5 after scouring.

EXAMPLE 20

One hundred ten parts of the addition product of ethylene oxide and 2,6-di-t-butylphenol (mol ratio 4:1) and 450 parts of benzene are blended and freed of moisture as in Example 11. To the cooled solution (10° C.) is added 2 parts of 45% $BF_3$ in ether and 25 parts propylene oxide. Temperature of the mixture begins to rise immediately, and in 15 minutes it is 56° C., at which time ethylene oxide gas is bubbled into the solution continuously. When the temperature of the mixture reaches 68° C., the reaction vessel is cooled in an ice bath to hold the temperature near 70° C. Addition of ethylene oxide is continued for one hour. The reaction mixture is then cooled to 25° C. and 25 parts of propylene oxide is added and addition of ethylene oxide is resumed. In 20 minutes the temperature reaches 72° C. and cooling of the reaction mixture is again used to hold the temperature near 70° C. After adding ethylene oxide for three hours longer, the reaction is stopped. At this point the weight gain of the reaction vessel is 270 parts from the addition of propylene and ethylene oxides.

The reaction mixture is diluted with 500 parts of toluene and washed with hot water to remove the $BF_3$ catalyst. The product is recovered from solvent by heating under vacuum to 165° C. It is a pale amber liquid and has a cloud point of 48–49° C. Its specific resistivity is $3.9 \times 10^7$ ohm-cm. On the basis of weight of the starting sample and weight gain noted above, this product contains 2,6-di-t-butylphenol, ethylene oxide and propylene oxide in the ratio 1:21:3. The product is coded E 21 P 3.

Twenty parts of this product, 200 parts of 66 nylon and 1 part sodium phenylphosphinate are melt blended and spun to fibers by standard procedures. Yarn is drawn 4× and has a log R of 11.5 after scouring.

EXAMPLE 21

Five hundred parts of an ethylene oxide adduct of 2,6-di-t-butylphenol (mol ratio 38:1) is converted to the sodium derivative by the procedure used in Example 15. The reaction mixture is cooled to 40° C. and 34 parts of benzyl chloride in 100 parts of toluene is added. The mixture is heated gradually to 120° C. and held there until a small portion of the reaction mixture, when diluted with water, has a pH of about 7. The reaction mixture is purified by the procedure of Example 15. The product is an amber solid which has a cloud point of 58° C. Its specific resistivity, measured on the liquified product at 31° C., is $1.5 \times 10^7$ ohm-cm. It is coded E 38 Ar.

This product is melt blended with 66 nylon and processed to yarn as described in Example 20. After scouring, the yarn has a log R of 11.4.

When the test is repeated by blending 10 parts of E 38 Ar with 90 parts of the polyamide from bis(4-aminocyclohexyl) methane and dodecane dioic acid, yarn made therefrom is likewise antistatic.

EXAMPLE 22

Three hundred parts of the ethylene oxide adduct of Example 16 and 300 parts of xylene are blended and freed of moisture. To the cooled solution is added 70 parts of acetic anhydride, and the mixture then is heated for 16 hours at 100–110° C. The product is stripped of solvent and by-product by heating to 180° C. at a pressure of 2 mm. It is an amber liquid having a cloud point of 36–37° C. Its specific resistivity is $1.9 \times 10^8$ ohm-cm. The product is coded E 10 Ac.

This product is melt blended with 66 nylon and spun to fibers as in Example 20. The log R of the scoured fibers is 12.9.

EXAMPLE 23

Four hundred twenty-five parts of the ethylene oxide adduct of Example 21 is converted to the sodium derivative. The mixture is cooled to 40° C. and 15.2 parts sulfuryl chloride ($SO_2Cl_2$) in 100 parts toluene is gradually added. Temperature of the mixture rises to 58° C. and the reaction vessel is further heated to 100° C. The cooled reaction mixture is washed with 10% NaCl solution and then freed of solvent by gradually heating to 190° C. at a pressure of 2 mm. The final product—the sulfate ester of the original anti-oxidant capped antistat—is an amber wax which has a cloud point of 80° C. The original antioxidant capped antistat has a cloud point >100° C. The product is coded E 38 S.

This product is melt blended with 66 nylon and spun to fibers as in Example 20. The scoured fibers have a log R of 12.2.

EXAMPLE 24

Four hundred fifty-five parts of the ethylene oxide adduct of Example 21 is converted to the sodium derivative. The mixture is cooled to 72° C. To this is added 150 parts toluene containing 28.1 parts of phosphonitrillic chloride, $(PNCl_2)_x$, this being a mixture of 80% trimer and 20% tetramer. Temperature rises to 85° C. during addition of this solution. The reaction mixture is heated to 115° C. The product is purified and recovered by the usual procedures. It is an amber solid when cold but, owing to its polymeric nature, a tacky rubber at 60° C.

As is well known, the cyclic phosphonitrillic chloride compounds are converted to linear polymers by heating.

The product formed in the reaction carried out above can be represented by the formula

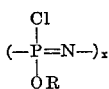

in which $x$ now is greater than 4 and R represents the antioxidant capped antistat. The product is coded E 38 N.

This product is melt blended with 66 nylon and spun to fibers by the procedure of Example 20. The scoured yarn has a log R of 12.7.

EXAMPLE 25

Four hundred parts of the antioxidant capped antistat of Example 21 is blended with 800 parts of toluene and freed of moisture in the usual manner. To the cooled solution is added 18.5 parts of toluene-2,4-diisocyanate in 100 parts of toluene. The mixture is gradually heated to 115° C., then freed of solvent by heating to 150° C. at a pressure of 2 mm. The product is an amber solid having a cloud point of 40° C. Its specific resistivity in the liquified form at 31° C. is $5.9 \times 10^7$ ohm-cm.

This product is melt blended with 66 nylon and converted to fibers as in Example 20. The scoured yarn has a log R of 11.4.

EXAMPLE 26

Spinning of an antistatic yarn having 17 filaments and a denier of 255 after drawing 4× is carried out on a full scale spinning unit by continuously melting 66 nylon, blending therewith 5% of an antioxidant capped polyethylene ether, metering this mixture to a spinneret by a spinning pump and continuously extruding and drawing fibers in conventional manner. The 66 nylon used has a relative viscosity of 40 and the polyether is the ethylene oxide adduct of 2,6-di-t-butylphenol (mol ratio 34:1). Before being blended with the nylon, the polyether is blended with 5% by weight based on weight of the polyether of polymethyl methacrylate (900,000 molecular weight; particle size 80 mesh) by gradually heating the mixed polyether and poly(methylmethacrylate) to 140° C. with continuous stirring. The added poly(methylmethacrylate) greatly increases the melt viscosity of the polyether, thereby facilitating its accurate metering into the nylon stream via gear pump and subsequent blending therewith in a mixing chamber.

Continuous spinning of fibers and collection of 1 pound bobbins of yarn is possible when the viscosity builder, i.e., poly(methylmethacrylate), is used in the polyether. When the viscosity builder is omitted, spinning performance is poor owing to imperfect mixing of the polyether. Only a few ounces of yarn can be collected on a bobbin before the threadline breaks down.

EXAMPLE 27

In the manner described in Example 26, yarn is spun from 66 nylon blended with a solution of 10 parts poly-(methylmethacrylate) in 100 parts of an ethylene oxide adduct of 2,6-di-t-butylphenol (mol ratio 10:1). In this case 7% of the polyether by weight is blended with the nylon. Continuous spinning is possible and 1 pound bobbins of yarn are collected. When the viscosity builder is omitted from the polyether, collection of yarn is impossible, owing to very frequent breakage of filaments at the spinneret.

As will have been obvious from the examples, the polyether of the present invention is conveniently prepared by the condensation of from about 10 to about 200 mols of alkylene oxide with a 2,6-disubstituted "hindered" phenol. The alkylene oxide may be a mixture of alkylene oxides in the desired ratio, or ethylene oxide and a higher alkylene oxide may be reacted separately, in either order. The "hindered" phenol is a phenol which is characterized by the presence of alkyl substituents (containing at least about three carbon atoms) on the ring in the 2 and 6 positions. These alkyl substituents reduce the reactivity of the hydroxyl group toward many reagents. These phenols are described in an article by Stillson et al., Jour. Am. Chem. Soc. 67, 303–307 (1945). The "hindering" becomes most effective when the substituent groups in the 2 and 6 positions are tertiary butyl and tertiary amyl. Other groups which may be employed with great effectiveness are phenyl and cyclohexyl. The "hindering" group is preferably bonded to the 2 and 6 positions of the phenol ring through a tertiary carbon. Less effective "hindering" groups are secondary butyl and isopropyl as pointed out in the Stillson article.

The phenols described above initiate condensation of ethylene oxide, in conjunction with an alkaline promoter, preferably those which do not produce water or alcohols on reaction with the phenol. The preferred promoter is metallic sodium or sodium hydride. The reactants may be brought together in the desired proportions, e.g., one mol of the phenol and the required number of mols (8 to 400) of ethylene oxide, depending on the molecular weight desired in the final product. To this may be added from about 0.005 mol to 0.6 mol of sodium hydride. Suitable reaction temperatures range from about 100° to 140° C. After the condensation product is formed, the reaction mixture is acidified to convert any sodium oxy groups in the polymers to hydroxyl groups. Acidic catalysts such as $BF_3$ may also be used to catalyze the addition of alkylene oxides to the hindered phenol. It is not necessary to carry out the condensation reaction at high pressure. The actual pressure is not critical. The reaction will proceed in an acceptable manner at atmospheric pressure. However, it is preferred to use a pressure in the range of about 10 p.s.i.g. to 30 p.s.i.g. It has been found that the polymerization proceeds satisfactorily despite the "hindered" reactivity of the phenolic group, due to the ortho substituents, merely requiring a longer than normal induction period. The resulting adduct is a polyether alcohol, substituted on one end by the hindered phenol radical. The adduct may be employed as the alcohol, or the alcohol may be reacted further via etherification or esterification to provide coupling or an end "cap," as shown in the examples. Alternatively, two polyether alcohols (which may both have hindered phenol at one end) may be coupled by reaction with a diisocyanate.

Reaction between the antioxidant-antistat and the polymer should be kept to a minimum. Such reaction not only reduces the level of static protection, but may sensitize the fiber to caustic attack. This effect is especially significant with polyester substrates. The reaction may be minimized chemically by using a terminal end-cap (other than the hindered phenol) for the polyether chain which is substantially non-reactive with the polyamide or polyester substrate. It may be minimized physically by adding the antioxidant-antistat very shortly before the extrusion step, so that the composition is held at temperatures where reaction might occur for a minimum length of time. The "capping radicals," therefore, may contain only those substituents which are substantially "non-polyamide or polyester-reactive" under melt-blending and spinning conditions.

A study of the structure of the phenol-ethylene oxide adduct of this invention shows that the ethylene oxide chain is bonded to the phenyl ring through the phenolic oxygen. This structure determination is confirmed by ultraviolet absorption, infrared and nuclear magnetic resonance spectra. This structure is distinct from the one disclosed in U.S. Patent No. 2,903,487, which shows that 2,6-di-tert-butylphenol reacts with sodium to form a salt which, when reacted further with benzoyl chloride or acrylonitrile, is benzoylated or alkylated at the 4 position in the ring.

The antioxidant antistatic agents of this invention may be added to polyamide monomer prior to or during the early stages of polymerization. However, this processing procedure requires that the antioxidant be subjected to polymerization temperatures for a relatively long period of time. Better results are usually obtained when the antioxidant-antistat is blended with the polymer shortly before spinning. This procedure is especially desirable in the case of polyesters since with these polymers there is a tendency for polyethylene ether alcohols or esters to react with the monomer or low molecular weight polymer during polymerization. Use of an ether end cap reduces this tendency to reaction. However, when making fiber, the composition of the invention is preferably spun substantially immediately after blending, which prevents reaction between the components and maintains uniformity of distribution as described below.

Proper distribution of the polyether as a separate phase in the fiber is essential to obtain a uniformly antistatic and uniformly opacified product. This is best obtained by mechanically mixing the melt in the polymer transfer line, although a conventional screw extruder may also be used when the two polymers have been previously combined. When properly mixed and spun the polyether is uniformly distributed as a separate phase, appearing as a plurality of rod shaped particles in polyamides, overlapping within the fiber but apparently not interconnecting. Although the polyether forms a separate phase in polyester compositions, the dispersed phase appears more as interconnecting fibrils in filaments formed therefrom. For maximum durability of the antistatic effect to washing, filaments formed from the compositions of this invention are preferably shaped by melt spinning. Accurate metering and uniform dispersion of the relatively low viscosity antioxidant-antistat in the high melt viscosity polyamide or polyester is facilitated when it is mixed with a high viscosity essentially inert additive, as shown in Examples 26 and 27. Suitable additives are poly(methylmethacrylate), poly(vinyl pyrrolidone), cellulose acetate and poly(vinyl butyral) for example. In general such a viscosity builder is important for commercial operation when the molecular weight of the antioxidant-antistat is below about 1000. For molecular weights between about 1000 and 5000 a viscosity builder is frequently advantageous, while for antioxidant-antistats with a molecular weight above about 5000 such an additive is generally of less importance.

The amount of the antioxidant-antistat to be added to the polyamide or polyester will depend primarily on the antistatic effect which is to be achieved. The addition of as little as 2% will reduce the static propensity of a fiber. On scouring, the residual polyether content is reduced to about 1%. Improved antistatic effect is produced by addition of larger amounts up to as much as 30%. For those products in which maximum covering power (fiber opacity) and surface luster are required, high concentration, (i.e., 7-15%) of the high molecular weight antioxidant-antistat are used. After scour, the residual polyether content is about 2-3%, providing satisfactory protection from static. In general, more than 30% of the antioxidant-antistat in filaments offers no advantage and often is undesirable, making spinning difficult. However, larger concentrations may be mixed with the base polymer for other uses or for subsequent mixing with a spinning composition.

The ratio of ethylene oxide to phenol in the antioxidant-antistat is also desirably adjusted depending on the polymer and the end use to which the end product is to be put. For those polyamide products where maximum durability of antistatic effect and minimum effect of scour on covering power is desired, the lower ratios of ethylene oxide to phenol are desired. This will normally be in the range of 10 to 40 ethylene oxide units per mol of phenol. Reduced extractability may also be attained by polymerizing other alkylene oxides with the ethylene oxide. For those products where maximum extractability of the additive is desired in order to produce maximum covering power, for instance in a filament, ratios of ethylene oxide per mol of phenol will range from 50 to 200. This will usually provide relatively less antioxidant protection, since antioxidant effect is roughly proportional to the mol ratio of phenol to total number of alkylene oxide residues.

Polyesters usually require an antioxidant-antistat of the highest possible ethylene oxide concentration consistent with maintaining sufficient antioxidant effect. This effect is "diluted" as the length of the polyether chain attached to the phenol is increased. As a guide, mol ratios of 100 to 200 to 1 are recommended.

Conversely, it may often be desirable (especially with polyamides) to use compounds with a low ratio of ethylene oxide to hindered phenol, and supplement the antistatic effect with a non-phenolic polyethylene oxide condensation product. Suitable supplemental antistatic agents are among those shown used separately as controls in the comparative samples of the examples.

The polyamides with which the antioxidant-antistat is to be blended, in accord with this invention, are linear polycarbonamides wherein the amide linkage is an integral part of the polymer chain. Similarly, the polyesters employed are linear condensation polymers wherein the carbonyl-oxy group is an integral part of the polymer chain.

Suitable polyamides for this invention are those melt-spinnable synthetic linear polyamides which are prepared from polymerizable monoamino monocarboxylic acids or their amide-forming derivatives, or from suitable diamines and suitable dicarboxylic acids or from amide-forming derivatives of these compounds. Typical of such polyamides are those formed from an aliphatic diamine and an aliphatic acid containing the repeating unit

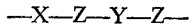

wherein —X— and —Y— represent divalent aliphatic, cycloliphatic or mixed aliphatic-cycloaliphatic groups and —Z— represents the

linkage. Especially useful polyamides are those in which —X— and —Y— are $(CH_2)_{n-1}$, wherein $n$ is a positive integar of from 1 to 12 inclusive, except that $n$ may not be 1 for both —X— and —Y— simultaneously. —X— and —Y— may be the same or different. Polyhexamethylene adipamide, polycaproamide (i.e., "66" and "6" nylons), polyundecanoamide or the polyamide from bis (p-aminocyclohexyl)methane and azelaic, sebacic, dodecane dioic, tetradecane dioic or other aliphatic dicarboxylic acids are typical. Other suitable polyamides are those having the repeating structure

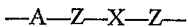

wherein —A— is a divalent aromatic radical and —X— and —Z— are as previously defined. Polyhexamethylene isophthalamide is illustrative of such polymers. Additionally polyamides having repeating units such as

and

wherein —B— is a divalent alkaryl (such as xylylene) may be used; only those polymers and copolymers which are melt spinnable are intended. Another class of suitable polyamides containing other than wholly aromatic intracarbonamide repeating units are those prepared from piperazine, such as those from piperazine and adipic acid, and the like.

Melt spinnable copolyamides and polyamide mixtures may also be used in accord with this invention.

The other preferred group of polymers for the practice of this invention is the melt spinnable fiber-forming synthetic linear condensation polyesters of bifunctional ester-forming compounds wherein at least about 75% of the repeating structural units of the polymer chain include at least one divalent carbocyclic ring containing at least six carbon atoms present as an integral part of the polymer chain and having a minimum of four carbon atoms between the points of attachment of the ring in the polymer chain (para-relationship in the case of a single six-membered ring). The polyesters may be derived from any suitable combination of bi-functional ester-forming compounds. Such compounds include hydroxy acids such as 4-(2-hydroxyethyl) benzoic acid, hydroxypivalic acid and 4-(2-hydroxyethoxy)benzoic acid, or mixtures of the various suitable bifunctional acids or derivatives thereof and the various suitable dihydroxy compounds and derivatives thereof. The repeating structural units of the polymer chain comprise recurring divalent ester radicals separated by predominantly carbon atoms chains comprising hydrocarbon radicals, halogen-substituted hydrocarbon radicals, and chalcogen-containing hydrocarbon radicals wherein each chalcogen atom is bonded to carbon or a different chalcogen atom, and no carbon is bonded to more than one chalcogen atom. Thus, the repeating units may contain ether, sulfonyl, sulfide, or carbonyl radicals. Sulfonate salt substituents may also be present in minor amounts, up to about 5 mol percent total sulfonate salt substituents in the polyester based on the number of ester linkages present in the polyester. Typical of these are repeating units derived from sulfonated isophthalic acid. Other suitable substituents may also be present.

Among the various suitable dicarboxylic acids for preparing polyesters are terephthalic acid, bromoterephthalic acid, 4,4'-sulfonyl-dibenzoic acid, 4,4'-diphenic acid, 4,4'-benzophenone-dicarboxylic acid, 1,2-bis(4-carboxylphenyl)ethane, 1,2 - bis(p - carboxyphenoxy)ethane, bis-4-carboxyphenyl ether and various of the naphthalene-dicarboxylic acids, especially the 1,4-, 1,5-, 2,6-, and 2,7-isomers. Isophthalic acid is also suitable, especially when used in combination with a 1,4-dihydroxyaromatic compound. Carbonic acid is similarly suitable.

Among the various suitable dihydroxy compounds for preparing polyesters are the glycols, such as ethylene glycol and other glycols taken from the series

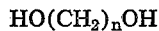
HO(CH₂)ₙOH wherein $n$ is 2 to 10; cis- or trans-p-hexahydroxylylene glycol; diethylene glycol; quinitol; neopentylene glycol; 1,4 - bis(hydroxyethyl)benzene; and 1,4-bis - (hydroxyethoxy)benzene. Other suitable compounds include dihydroxyaromatic compounds such as 2,2 - bis(4-hydroxy-3,5-dichlorophenyl)propane, 2,2 - bis(4-hydroxy-phenyl) propane, hydroquinone, and 2,5- or 2,6 - dihydroxynaphthalene.

The polyether-modified compositions of this invention may also contain suitable light stabilizers, ultraviolet absorbers, delusterants, pigments, dyes, and the like. Delusterants and pigments may be added before, along with, or after the polyether. It is often desirable to add polyamide antioxidant, such as, for example, those disclosed in U.S. Patents 2,510,777 and 2,981,715. Of these sodium phenyl phosphinate is a preferred species.

The composition of the present invention may be used or produced in any shape or state of aggregation, e.g., film, plexifilament, fiber, staple, floc, yarn, tow, cord, fabric or the like.

The modified polymer of this invention may be used as a component of a cospun yarn in which filaments of two or more different compositions are spun simultaneously to make a mixed filament yarn or as a component of a side-by-side or a sheath core yarn. The yarn bundle may also be separated and given different treatments wherein a differential shrinkage, bulkable yarn is produced, as disclosed, for example, in British Patent 787,157. The polymer is also suitable for the process of British Patent 839,418.

Filaments made from the composition of the present invention may be used alone, or may be plied or blended with other natural, synthetic or man-made fiber. The filaments of the invention are readily dyed, bleached, pigmented, printed or the like. They may be textured, bulked, heat-set, twisted, crimped, or any combination of these processes. Due to decreased dye sensitivity to steam bulking conditions, they are especially suitable for this use. In addition to steam bulking hot air bulking as described in Belgian Patent 573,230 may be used. They may be knitted to tricot, jersey, tissue, satinette or circular knit or full-fashioned hose. They may be woven, alone or in combination with other fiber, to taffeta, twill, satin, crepe and the like. The fibers are especially useful in the pile of pile fabrics, such as velvet, plush, rugs, carpets and artificial fur. Rugs and carpets of these fibers are especially useful due to their antistatic properties, attractive luster, fiber opacity combined with an unexpected degree of soil repellance. Their antistatic behavior is often so effective that a minor proportion serves to reduce to an acceptable level, the static propensity of a fabric in which they are combined with unmodified hydrophobic filaments.

Many equivalent modifications will be apparent to those skilled in the art from a reading of the above without a departure from the inventive concept.

What is claimed is:
1. A compound of the formula

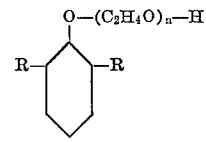

wherein the hexagon represents the benzene nucleus, R is tertiary butyl and $n$ is a number from 50 to 200 inclusive.

References Cited
UNITED STATES PATENTS

| | | | |
|---|---|---|---|
| 3,013,086 | 12/1961 | Young et al. | 260—613 |
| 3,168,576 | 2/1965 | Jezl | 260—613 X |
| 3,234,170 | 2/1966 | Stumpf et al. | 260—613 X |

BERNARD HELFIN, *Primary Examiner.*